Oct. 27, 1959  E. T. OAKES  2,910,017
AUTOMATIC COOKIE FEEDER FOR DEPOSITION AND SANDWICHING
Filed May 18, 1956  2 Sheets-Sheet 1
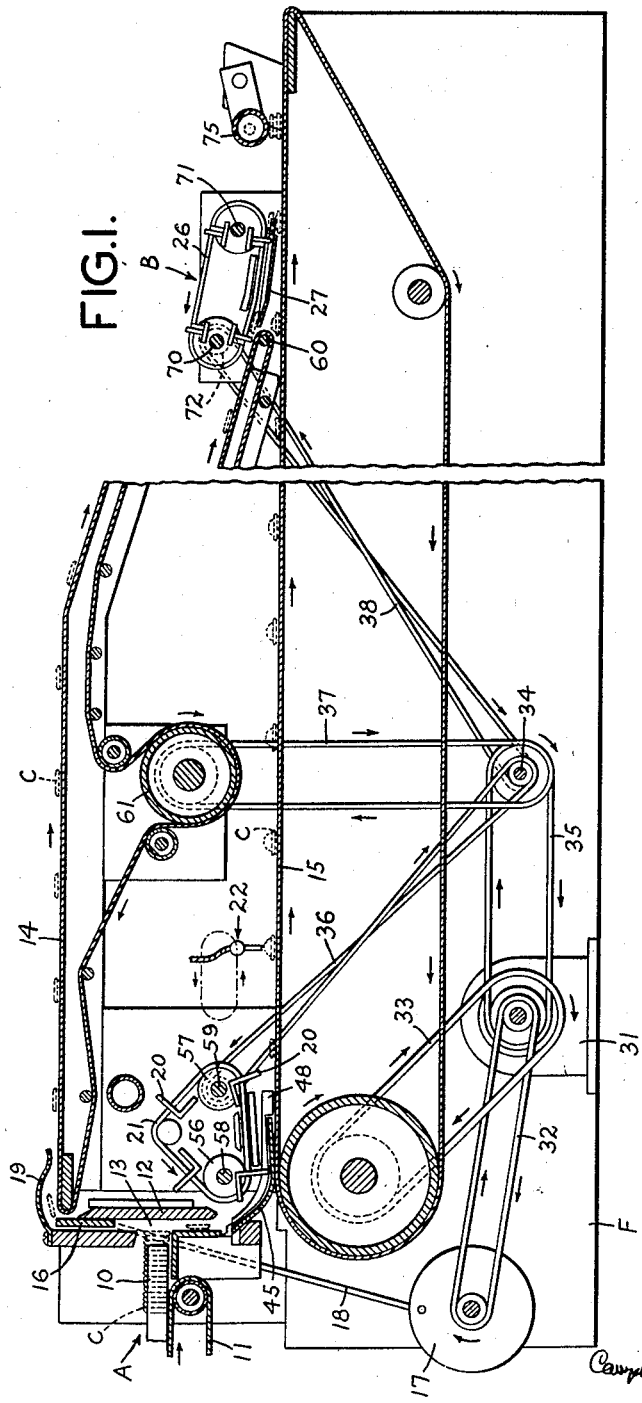
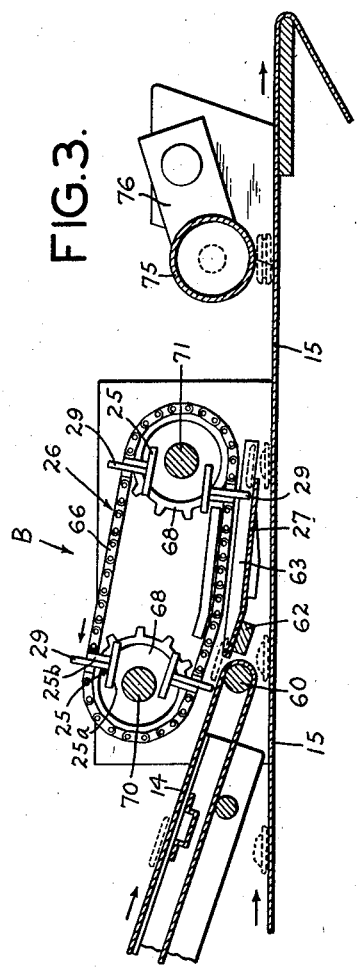
INVENTOR
EARLE T. OAKES
BY
HIS ATTORNEYS

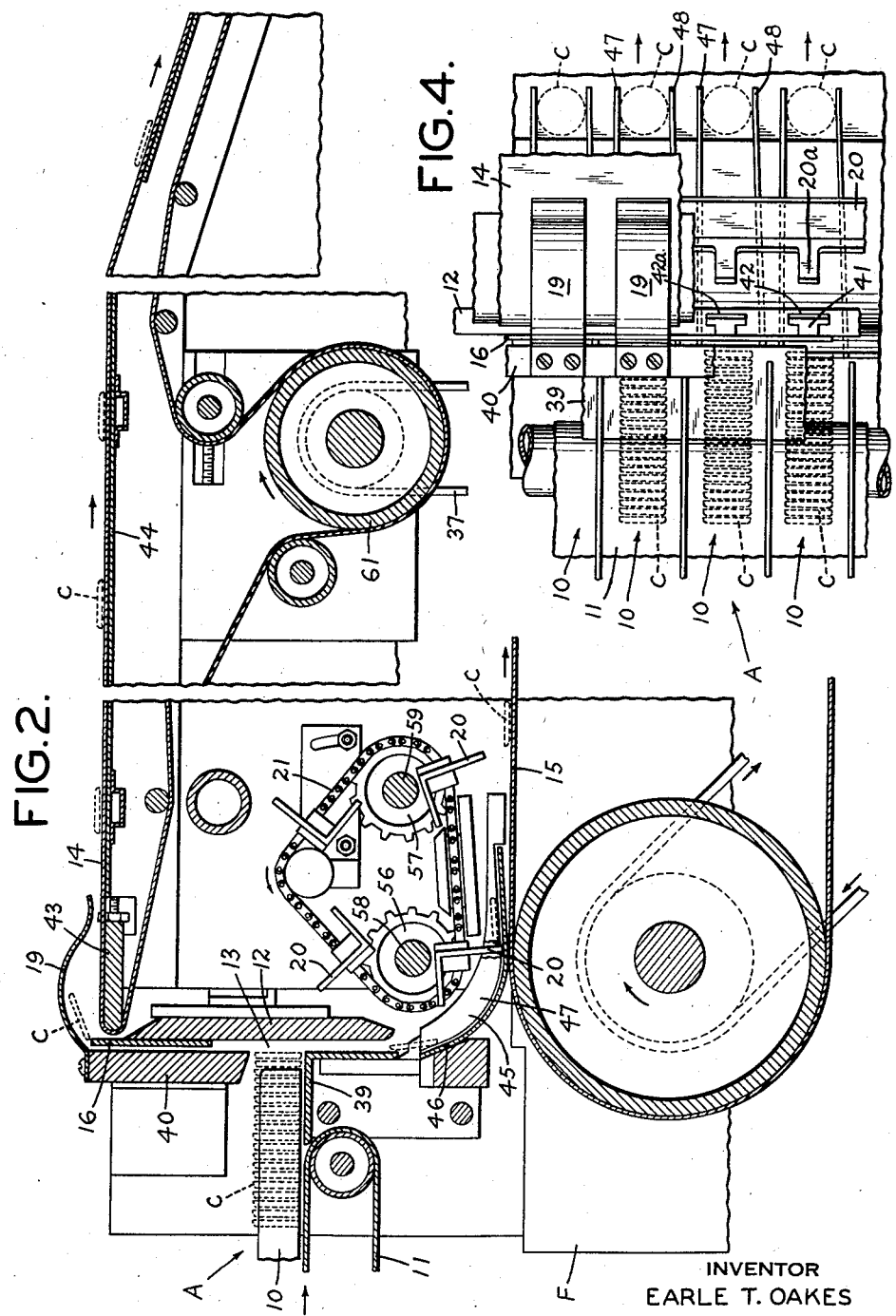

United States Patent Office
2,910,017
Patented Oct. 27, 1959

2,910,017

AUTOMATIC COOKIE FEEDER FOR DEPOSITION AND SANDWICHING

Earle T. Oakes, East Islip, N.Y., assignor to The E. T. Oakes Corporation, Islip, N.Y., a corporation of New York Application May 18, 1956, Serial No. 585,680

11 Claims. (Cl. 107—1)

This invention relates to improvements in sandwich making machines and it relates particularly to machines for making sandwich type cakes, cookies, pastries and the like in which pairs of cookies, cakes or the like are provided with an interposed filling of jelly, cream, marshmallow, cake filling, nut butter or the like.

Apparatus for making sandwiches of the type developed heretofore have included means for feeding cakes or cookies, hereinafter referred to generally as cakes, past a depositing device in such a manner as to deposit a coating or topping of cake filling, cream filling, jelly or the like on them. Thereafter uncoated cakes are brought into superimposed relation to the coated cakes and are pressed against the coatings thereon to form the completed sandwiches.

One of the problems encountered in the use of machines of the type described above is to provide a suitable mechanism for indexing or positioning of the cakes so that the uncoated cake can be brought into accurate register with the lower coated cake thereby to enable them to be brought together accurately to form perfect sandwiches.

A characteristic of some of the prior sandwich making machines is that they have two banks of magazines or hoppers for supplying the cakes to form the upper and lower portions of the sandwich; the banks being spaced lengthwise of the machine and one of them overlying the machine. With two sets of cake magazines, it is difficult for the operators, one on either side of the machine to reach to the middle of the machine and supply cakes to the second magazine. Moreover, with two magazines to supply, at least four people are required to fill the magazines.

In my earlier applications, Serial Nos. 440,409, now U.S. Patent No. 2,817,306, dated December 24, 1957, and 484,020, now U.S. Patent No. 2,853,961, dated September 30, 1958, I have disclosed sandwich making machines which enable the proper feeding of the sandwich assembling device from a single magazine of hoppers and I have also disclosed various mechanisms by means of which rows of cakes can be fed and selected rows of cakes supplied with a topping before they are brought together to form the completed sandwiches.

The present invention constitutes a modified form of device for producing sandwiches of the type described and in which an improved and positive feed mechanism is provided for supplying cakes to a topping or depositing machine and to an assembling device by means of which the cakes can be exactly superimposed to form perfect finished sandwiches.

More particularly, the present invention involves a magazine system which is arranged horizontally to facilitate the introduction of the cookies into it and which cooperates with a stripping or feeding mechanism by means of which alternate cakes are fed from each hopper of the magazine onto different conveyors to be advanced along separate paths so that one row of cakes passes by a depositing machine and receives topping or coatings thereon, while the other cakes are carried along and brought into superimposed relation to the coated cakes and then pressed together to form the completed sandwiches.

The new apparatus in accordance with the present invention includes mechanism by means of which the cakes can be guided accurately onto the conveyors and accurately superimposed in order to form perfect sandwiches. It provides a solution to the problem of facing the base cakes in the proper relation to make the sandwich. Most base cakes have plain bottoms and tops with designs on them, or they may have flat bottoms and rounded tops. In other words, tops of the cakes carry the design and the bottoms are smooth and plain. When stacking of the base cakes in rows across the apron, they are all stacked so that the bottoms face one way and the tops the other. With the bottoms facing the front or direction of travel, the cake receiving the icing deposit must be dispensed with the bottom up while the capping cake must cover the iced cake with the top up. The new apparatus takes the cakes from the horizontal feed in which they are all stacked with the bottoms facing forward. On the upstroke of the dispensing bar, cakes are placed on the upper apron with the tops up and the bottoms down. On the downstroke, cakes are placed on the lower apron with the bottoms up to receive the icing and the tops down. In this way, the new machine properly positions the faces of the cakes relative to each other and brings them into accurate register.

For better understanding of the present invention reference may be had to the accompanying drawing in which:

Figure 1 is a schematic showing of a typical apparatus embodying the present invention illustrating the relation of parts, the drive mechanism therefor and the operation of the apparatus in producing sandwiches;

Figure 2 is a view in vertical section through a portion of the cake magazines and the feed mechanism by means of which the cakes are removed from the magazines and transferred to separate conveyors;

Figure 3 is a view in section of the mechanism for registering and placing the top cakes on the lower iced cakes; and Figure 4 is a plan view of a portion of the magazines and feed mechanism for supplying the cakes to the separate conveyors of the apparatus, parts being broken away to disclose details of the mechanism.

Figure 1 of the drawings illustrates schematically a typical apparatus for making sandwiches. As shown, the apparatus includes a magazine A including one or more troughs 10 forming hoppers for receiving horizontal stacks of cakes C to be supplied to the apparatus. The cakes are supplied into the troughs 10 by an operator or delivered there directly from the oven conveyors. A driven conveyor belt 11 forms the bottom of the several troughs and its upper flight is driven from left to right at constant speed to advance the cakes continuously toward the right and keep them in contact. While the conveyor 11 moves continuously, the stacks of cakes are advanced intermittently, inasmuch as the leading cake of each stack is limited in its forward movement by means of an upright plate 12 forming the back of a feed slot 13 through which the cakes are directed to upper and lower conveyor belts 14 and 15, respectively, by means of the reciprocating pusher or stripper bar 16 which is driven by means of a crank 17 and connecting rod 18. Stripper bar 16 moves up and down in the slot 13 alternately pushing a cake up the slot 13 and a succeeding cake down the slot. Cakes pushed up the slot are deposited on the conveyor belt 14 in a right side up position by means of thin curved flexible fingers 19 for travel with the belt 14 in spaced apart relation. Cakes pushed down the slot 13 are engaged by pusher fingers 20 on a belt or chain 21 to position the cakes in accurately spaced relation on the conveyor belt 15 where they are advanced successively past a depositor 22 of any desired type; for example, a depositor like that disclosed in my U.S. Patent No. 2,664,055, dated December 29, 1953.

The cakes C on the conveyor belts 14 and 15 are advanced to the right and are brought together by means of the assembling device B at the right hand end of the conveyors 14 and 15. The assembly device B includes a series of pushing elements 25 mounted on a flexible chain system 26 which is driven in such a manner that each cake C discharged from the conveyor 14 onto a chute 27 is pushed along and deposited on top of the topping carried by a cake on the conveyor 15. The pushers 25 have downwardly extending fingers 29 thereon which engage behind the cakes and advance them at a slightly higher rate of speed than the conveyor 15.

As will be seen from the diagrammatic illustration of Figure 1, a motor 31 drives the crank 17 by means of a belt or a chain 32 and it also drives the conveyor 15 by means of a belt or chain 33 so that these elements travel in timed relation. The motor 31 also drives a counter shaft 34 by means of a belt or chain 35, this counter shaft carrying pulleys or sprockets which, together with the belts or chains 36, 37 and 38, drive the pusher conveyor 20, the conveyor 14, and the chain 26 of the assembling device B in timed relation to each other. The depositor 22 is similarly driven in timed relation to the conveyor 15 and the conveyor 20. It will be understood that all of the conveyors and other elements may be supported on suitable shafts or the like journaled in the side plates of a supporting frame F which is shown schematically in Figure 1.

Having described the general principles and operation of the apparatus disclosed in Figure 1, the details of individual parts of the apparatus will now be described.

As shown in Figures 1 and 2, the frame F supports the transverse partition plate 12 which limits the forward travel of the cakes C in the trough 10. A supporting plate or angle bar 39 supports the forward end of the trough and forms a lip or extension over which the cakes are advanced. It also serves as a guide surface at the left hand side of the feeding slot 13.

Above the trough C is mounted another guide plate and transverse reinforcing element 40 which serves as a guide surface at the upper portion of the feed slot 13.

The feeding or stripper bar 16 is mounted for sliding movement between the plates 12, 39 and 40 and is guided in its movement by means of one or more flanges or guide ribs 41 which engage in grooves 42 and 42a in the face of the plate 12 and prevent tilting and endwise movement of the bar 16.

The transverse guide plate or bar 40 serves to support the resilient fingers 19 adjacent to the leading end of the conveyor belt 14.

A small diameter roller or a fixed bar 43 supports one end of the conveyor 14. Moreover, the upper flight of the conveyor 14 slides over a stationary supporting plate 44 extending across the frame.

At the lower end of the slot 13 is a chute member 45 which, as shown in Figure 3, may consist of a curved plate 46 having a series of spaced apart partition strips 47 disposed above it. The upper end of each partition strip 47 is secured to the lower end of the transverse bar 39 below a corresponding trough 10 and serves as a lateral abutment to guide the cakes accurately onto the conveyor 15. Alternating with the guide strips 47 are resilient guide strips 48 which urge the cakes C against the guide strips 47 to align the cakes in rows on the conveyor 15. The strips 47 and 48 may be mounted to enable them to be adjusted laterally in one direction or the other relative to the conveyor 15 for alignment purposes.

Movement of the cakes along the chutes 45, is caused by the pusher fingers 20a on the feed conveyor 20. As shown in Figure 4, the pusher fingers 20a are narrow strip-like extensions from the angle plates 20 secured to spaced apart links of the chain 21. The width of the fingers 20a is such that they can pass between the guide plates 47 and 48 and engage the trailing edge of a cake retained thereby. The conveyor 20 may include a pair of chains 21, mounted on pairs of sprockets 56 and 57 fixed in spaced relation to and on the shafts 58, 59 in the frame F. One of the shafts is driven by means of the belt 36, as described above. The cakes are positioned accurately with respect to each other on the conveyor 15 by the fingers 20a inasmuch as they determine the spaced relation between the cakes by traveling somewhat faster than the conveyor 15. The timed relation of the cakes and their spacing is such that they are properly aligned with the depositor 22 to receive the topping of filling thereon.

The speed of movement of the conveyor 14 is similar to that of the conveyor 15 but means is not provided for accurately aligning and positioning the cakes initially on the conveyor 14.

As shown in Figures 1 and 3, the right hand end of the conveyor 14 is supported by means of a roll 60 journaled in the frame F. The mid portion of the lower flight of the conveyor 14 extends around a roller 61 that is driven by the belt or chain 37. The conveyor 14 advances the cakes one after another in rows and discharges them to the chute 27 mounted in the frame and positioned above the conveyor 15. As shown in Figure 3, the chute 27 is supported on a crossbar 62 which extends between the sides of the frame F above the tops of the cakes C on the conveyor 15. A series of guide plates 63 are fixed to the crossbar 62 and extend lengthwise of the chute 27 so that the cakes advanced by the conveyor are formed into accurately aligned rows overlying the rows of cakes C on the conveyor 15. The guide plates may be arranged similarly to the guide strips 47 and 48 to assure the desired alignment of the cakes and accurate positioning thereof transversely of the conveyor 14 as they are advanced by the fingers 29 on the pushers 25. Spacing of the pushers 25 is directly related to the spacing of the cakes on the conveyor 15 so that a pusher finger 29 can pick up a cake on the chute 27 and bring it into a position overlying a cake C on the conveyor 15 having a topping thereon. The pusher fingers 29 pass between the guide plates 63 and are long enough to engage the trailing edge of the upper cake C. Moreover, the conveyor 26 is timed to operate so that both the upper and lower cakes move at the same speed. The device B includes a pair of spaced apart chains 66 passing over pairs of spaced sprockets 68, 69 which are supported by means of the shafts 70 and 71 for rotation in the frame F. As described above, the chain system 26 is driven by means of the belt or chain 38 and a pulley 72 on the shaft 70. The entire sandwich assembling device B may be mounted in the frame F for adjustment relative to the conveyor 15 to accommodate cakes of different thickness and to modify the timing of the apparatus.

Each of the pusher members 25 includes a plate-like base 25a which is fixed to each chain by means of arms 25b at the opposite ends of the base connected to a link of each chain. The base 25a and the pusher fingers 29 mounted on it are capable of limited rocking movement relative to the chains 66 by virtue of the limited movement permitted each link of the chain.

From the preceding description it will be apparent that the mechanism is arranged and timed so that the cakes or the like are fed alternately up and down from each stack and are deposited on the conveyors 14 and 15 in rows in closely related relationship, the cakes on the conveyor 15 being accurately positioned to receive topping or filling from the depositor 22 by means of the pushers 20 and the guide strips 47, 48. The cakes on the upper conveyor 14 are also aligned and positioned as they come down the chute 27 by means of the pusher fingers 29 and the guide plates 63 so that they are accurately registered with the topped cakes moving along the conveyor 15. When the cakes are registered, they are pressed together by means of a pressing roller 75 mounted at the right hand end of the frame F. Levers 76 at opposite ends of the rolls 75 permit adjustment of the spacing between the roll 75 and the conveyor 15 to accommodate cakes of different thicknesses. After the cakes are pressed together they are discharged by the conveyor 15 ready for packaging or such further treatment as may be desired. With the apparatus described, misalignment of the cakes is avoided because they are accurately positioned at the critical points of their path of movement.

It will be understood that the apparatus can be modified in its arrangement of elements and the other drive elements than the belt or chain drive may be used if desired. Accordingly, the form of the invention described herein should be considered as illustrative of the invention.

I claim:

1. A sandwich making apparatus comprising superimposed upper and lower conveyors, means for driving said conveyors in the same direction, a trough for receiving a row of cakes in face to face relation, means for advancing said row of cakes along said trough toward one end thereof, a stripper member movable past said one end of said trough for feeding cakes from said trough alternately to said conveyors, means adjacent to the end of the upper conveyor and overlying the lower conveyor for advancing a cake from the upper conveyor into alignment with a cake on the lower conveyor into superimposed relation, and means for operating said last-mentioned cake advancing means, said stripper member, and said lower conveyor in timed relation to align and superimpose said cakes on said upper and lower conveyors.

2. The sandwich making apparatus set forth in claim 1 in which said trough has an open bottom portion, and the means for advancing the row of cakes along the trough comprises a conveyor having a flight in said open bottom portion, and means for driving said conveyor to advance said cakes along said trough.

3. The sandwich making apparatus set forth in claim 1 comprising means for guiding said stripper member for substantially vertical reciprocation adjacent to said hopper and means for reciprocating said stripper member to feed cakes to said conveyors alternately on up and down strokes of said stripper member.

4. The sandwich making apparatus set forth in claim 1 in which said means for advancing a cake from said upper conveyor comprises a plurality of pusher members, flexible means supporting said pusher members for movement in an orbital path, means for moving said flexible means to advance said pusher members to engage cakes from said upper conveyor and move them at the same speed as the cakes on said lower conveyor to bring said cakes into said superimposed relation.

5. A sandwich making apparatus comprising a pair of substantially parallel conveyors, means for driving said conveyors in the same direction, a trough for receiving a row of cakes face to face relation, stripper means movable adjacent to one end of said trough for feeding cakes from said trough alternately to said conveyors, and means adjacent to the end of the upper conveyor and overlying the lower conveyor for advancing a cake from the upper conveyor into superimposed relation to a cake on the lower conveyor.

6. A sandwich making apparatus comprising a plurality of substantially, horizontally arranged troughs for receiving stacks of cakes, each trough having an open bottom portion, a conveyor underlying each trough and at least partially closing said open bottom portion of each to support said stacks of cakes, means for driving said conveyor to advance said cakes lengthwise of said troughs, an abutment member adjacent to and spaced from the ends of said trough defining therewith a substantially vertical slot, a stripper member in and movable up and down said slot to engage below and above successive cakes advanced from said troughs, means for moving said stripper member up and down in said slot, upper and lower conveyors, each having an end adjacent to different ends of said slot to receive successive cakes from said troughs, means to drive said conveyors in the same direction at substantially the same speed, and means overlying the lower conveyor for receiving cakes from the upper conveyor and aligning and superimposing them on cakes on said lower conveyor.

7. A sandwich making apparatus comprising a plurality of substantially, horizontally arranged troughs for receiving stacks of cakes, each trough having an open bottom portion, a conveyor underlying each trough and at least partially closing said open bottom portion of each to support said stacks of cakes, means for driving said conveyor to advance said cakes lengthwise of said troughs, an abutment member adjacent to and spaced from the ends of said trough defining therewith a substantially vertical slot, a stripper member in and movable up and down said slot to engage below and above successive cakes advanced from said troughs, means for moving said stripper member up and down in said slot, upper and lower conveyors, each having an end adjacent to different ends of said slot to receive successive cakes from said troughs, means to drive said conveyors in the same direction at substantially the same speed, and means overlying said lower conveyor for receiving cakes from the upper conveyor and superimposing said cakes on cakes on said lower conveyors.

8. The sandwich making apparatus set forth in claim 7 in which said means for aligning and superimposing said cakes comprises a pair of parallel flexible members, rotary means supporting said flexible members for movement in an orbital path, and pusher elements connected to and extending between said flexible members and moveable therewith to engage cakes received from said upper conveyor and advance them.

9. In a sandwich making apparatus the subcombination of a plurality of substantially, horizontally arranged troughs for receiving stacks of cakes, each trough having an open bottom portion, a conveyor underlying each trough and at least partially closing said open bottom portion of each to support said stacks of cakes, means for driving said conveyor to advance said cakes lengthwise of said troughs, an abutment member adjacent to and spaced from the ends of said trough defining therewith a substantially vertical slot, a feed member in and movable up and down said slot to engage below and above successive cakes advanced from said troughs, and means for moving said feed member up and down in said slot.

10. In a sandwich making apparatus the subcombination of a plurality of substantially, horizontally arranged troughs for receiving stacks of cakes, each trough having an open bottom portion, a conveyor underlying each trough and at least partially closing said open bottom portion of each to support said stacks of cakes, means for driving said conveyor to advance said cakes lengthwise of said troughs, an abutment member adjacent to and spaced from the ends of said trough defining therewith a substantially vertical slot, a feed member in and movable up and down said slot to engage below and above successive cakes advanced from said troughs, means for moving said feed member up and down in said slot, upper and lower conveyors, each having an end adjacent to said slot to receive successive cakes from said troughs, and means to drive said conveyors in the same direction at substantially the same speed.

11. The sandwich making apparatus set forth in claim 7 in which said means for aligning and superimposing said cakes comprises a pair of parallel flexible members, rotary means supporting said flexible members for movement in an orbital path, and pusher elements connected to and extending between said flexible members and movable therewith to engage cakes received from said conveyor and cakes on said lower conveyor to advance them together.

References Cited in the file of this patent

UNITED STATES PATENTS

| | | |
|---|---|---|
| 1,575,207 | Hungerford | Mar. 2, 1926 |
| 1,973,195 | Ankcorn | Sept. 11, 1934 |
| 2,391,937 | Arvidson | Jan. 1, 1946 |
| 2,722,900 | Knee | Nov. 8, 1955 |